(12) United States Patent
Gisch

(10) Patent No.: US 11,883,791 B2
(45) Date of Patent: *Jan. 30, 2024

(54) POLYMERIC BEADS

(71) Applicant: DDP SPECIALTY ELECTRONIC MATERIALS US, LLC, Wilmington, DE (US)

(72) Inventor: Daryl J. Gisch, Midland, MI (US)

(73) Assignee: DDP SPECIALTY ELECTRONIC MATERIALS US, LLC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/765,383

(22) PCT Filed: Nov. 16, 2018

(86) PCT No.: PCT/US2018/061452
§ 371 (c)(1),
(2) Date: May 19, 2020

(87) PCT Pub. No.: WO2019/112775
PCT Pub. Date: Jun. 13, 2019

(65) Prior Publication Data
US 2020/0338524 A1    Oct. 29, 2020

Related U.S. Application Data

(60) Provisional application No. 62/595,241, filed on Dec. 6, 2017.

(51) Int. Cl.
| | | |
|---|---|---|
| *G01N 33/68* | (2006.01) |
| *G01N 33/50* | (2006.01) |
| *G01N 33/543* | (2006.01) |
| *B01J 20/06* | (2006.01) |
| *B01J 47/016* | (2017.01) |
| *B01J 20/32* | (2006.01) |
| *C02F 1/42* | (2023.01) |
| *C02F 101/22* | (2006.01) |

(52) U.S. Cl.
CPC ............ *B01J 20/06* (2013.01); *B01J 20/321* (2013.01); *B01J 20/3236* (2013.01); *B01J 47/016* (2017.01); *C02F 1/42* (2013.01); *B01J 2220/46* (2013.01); *C02F 2001/422* (2013.01); *C02F 2101/22* (2013.01)

(58) Field of Classification Search
CPC ...... B01J 20/06; B01J 20/321; B01J 20/3236; B01J 47/016; C02F 1/42
See application file for complete search history.

(56) References Cited

U.S. PATENT DOCUMENTS

| | | |
|---|---|---|
| 4,178,270 A | 12/1979 | Fujita et al. |
| 4,284,726 A | 8/1981 | Shigetomi |
| 7,708,892 B2 | 5/2010 | Klipper et al. |
| 2006/0237371 A1* | 10/2006 | Sylvester ........... B01J 20/28028 210/684 |
| 2008/0035564 A1* | 2/2008 | Moller .................... C02F 1/288 205/75 |

FOREIGN PATENT DOCUMENTS

WO    2017/109521 A1    6/2017

OTHER PUBLICATIONS

Balan et al., Chemical Industry & Chemical Engineering Quarterly, (2013), 19(4), 615-628.*
Purolite Catalog 2023 "Purolite® A500Plus".*
PCT International Search Report dated Apr. 26, 2019, for International Application No. PCT/US18/061452, filed Nov. 16, 2018; ISA/EPO; Nicoleta Kaluza, Authorized Officer.

* cited by examiner

*Primary Examiner* — Yong L Chu

(57) ABSTRACT

Provided is an anion exchange composition comprising
(a) polymeric beads having covalently bound amine groups, and
(b) tin(II) oxide.

10 Claims, No Drawings

POLYMERIC BEADS

Hexavalent chromium, also known as chromium (VI) is used in a wide variety of industrial processes. Hexavalent chromium is sometimes present as an undesired contaminant in water. Processes that remove hexavalent chromium from water are desirable.

U.S. Pat. No. 7,708,892 describes the use of ion exchangers doped with metal. According to U.S. Pat. No. 7,708,892, the metal used for doping may be any of a variety of metals. According U.S. Pat. No. 7,708,892, the metal-doped ion exchanger may be used for removing from water a variety of dissolved contaminants, including contaminants that contain both oxygen atoms and metal atoms, where the metal atom may be chosen from a variety of metals. It is desired to provide an ion exchange composition that is particularly effective at removing hexavalent chromium from water.

The following is a statement of the invention.

A first aspect of the present invention is an anion exchange composition comprising
(a) polymeric beads having covalently bound amine groups, and
(b) tin(II) oxide.

A second aspect of the present invention is a method of treating water comprising bringing water that contains dissolved chromium (VI) into contact with an anion exchange composition comprising
(a) polymeric beads having covalently bound amine groups, and
(b) tin (II) oxide.

The following is a detailed description of the invention.

As used herein, the following terms have the designated definitions, unless the context clearly indicates otherwise.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Molecules that can react with each other to form the repeat units of a polymer are known herein as "monomers." The repeat units so formed are known herein as "polymerized units" of the monomer.

Vinyl monomers have the structure

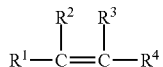

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers. Some vinyl monomers have one or more polymerizable carbon-carbon double bonds incorporated into one or more of $R^1$, $R^2$, $R^3$, and $R^4$; such vinyl monomers are known herein as multifunctional vinyl monomers. Vinyl monomers with exactly one polymerizable carbon-carbon double bond are known herein as monofunctional vinyl monomers.

Styrenic monomers are vinyl monomers in which each of $R^1$ and $R^2$ is hydrogen, $R^3$ is hydrogen or alkyl, and —$R^4$ has the structure

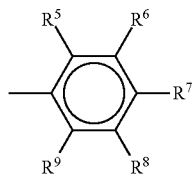

where each of $R^5$, $R^6$, $R^7$, $R^8$, and $R^9$ is, independently, a hydrogen, a halogen, an aliphatic group (such as, for example, an alkyl group or a vinyl group), a substituted aliphatic group, an aryl group, a substituted aryl group, another substituted or unsubstituted organic group, or any combination thereof.

A reaction among monomers to form one or more polymers is referred to herein as a polymerization process.

A polymer is said herein to contain polymerized units of the monomers used in making the polymer, even if some or all of those polymerized units are, after polymerization, altered by the addition of one or more functional groups. For example, a copolymer made from styrene and DVB in a weight ratio of styrene:DVB of 90:10 is said to have 90% by weight polymerized units of styrene. If that copolymer were to be then altered by reaction with sulfuric acid to replace some of the hydrogen atoms on aromatic rings with sulfonic acid groups, the resulting functionalized polymer would still be said to have 90% by weight polymerized units of styrene.

Macroporous polymeric beads have a porous structure with average pore diameter of 20 nm or larger. Pore diameter is measured using the Brunauer-Emmett-Teller (BET) method using nitrogen gas. Macroporous polymeric beads are normally made by incorporating a porogen into monomer droplets. The porogen is soluble in the monomer, but the polymer does not dissolve in the porogen, so that, as the polymer forms, phase-separated domains of porogen remain. After polymerization, the porogen is removed by evaporation or by washing with solvent. The porous structure of the polymeric bead is the empty space left when the porogen is removed from its phase-separated domains.

Gel type polymeric beads are made without the use of porogen. The pores in gel type polymeric beads are the free volumes between the atoms in the entangled, possibly crosslinked polymer chains of the polymeric bead. The pores in gel type polymeric beads are smaller than 20 nm. In some cases, the pores in gel type resins are too small to be detected using the BET method.

As used herein, ion exchange is a process in which a solution comes into contact with an ion exchange resin. Prior to the contact with the solution, the ion exchange resin has functional groups of a certain charge, and has ions of the opposite charge associated with the functional groups. When the solution comes in contact with the ion exchange resin, some ions in solution become attached to the ion exchange resin by exchanging places with ions of the same charge that had been associated with the functional groups on the ion exchange resin.

A polymeric bead is a particle that contains 90% or more by weight, based on the weight of the particle, organic polymer. A polymeric bead is spherical or nearly spherical. A polymeric bead is characterized by its radius. If the bead is not spherical, the radius of the bead is taken herein to be the radius of a "reference sphere," which is the imaginary sphere that has the same volume as the bead.

As used herein, "ambient temperature" is synonymous with "room temperature" and is approximately 23° C.

A collection of particles may be characterized by the volume mean diameter.

Ratios are characterized herein as follows. For example, if a ratio is said to be 5:1 or higher, it is meant that the ratio may be 5:1 or 6:1 or 100:1 but may not be 4:1. To state this characterization in a general way, if a ratio is said to be X:1 or higher, then the ratio is Y:1, where Y is greater than or equal to X. Similarly, for example, if a ratio is said to be 2:1 or lower, it is meant that the ratio may be 2:1 or 1:1 or 0.001:1 but may not be 3:1. To state this characterization in a general way, if a ratio is said to be Z:1 or lower, then the ratio is W:1, where W is less than or equal to Z.

The anion exchange composition of the present invention contains a collection of polymeric beads. The polymeric beads contain polymer. Polymeric beads are particles that are solid at 25° C. and that contain polymer in the amount, by weight based on the weight of the polymeric particles, of 90% or more; more preferably 95% or more.

The anion exchange composition of the present invention also contains tin(II) oxide. Preferably, the amount of sum of the weight of the polymeric beads and the tin(II) oxide, as a percentage of the total weight of the anion exchange composition, is 90% or more; more preferably 95% or more; more preferably 99% or more.

The polymeric beads may be macroporous beads or gel beads. Preferred are macroporous beads.

Preferred polymers in the polymeric particles are the polymers formed by free radical polymerization vinyl monomers Preferred vinyl monomers are styrenic monomers, acrylic monomers, and mixtures thereof. Preferably, all the monomers used are selected from styrenic monomers, acrylic monomers, and mixtures thereof; more preferably from styrenic monomers. More preferably, all the monomers used are selected from styrenic monomers. The vinyl monomer preferably includes one or more monofunctional vinyl monomers. Preferred monofunctional vinyl monomers are acrylic and styrenic monofunctional monomers; more preferred are monofunctional styrenic monomers; more preferred is styrene. The vinyl monomer preferably includes one or more multifunctional vinyl monomers. Preferred multifunctional vinyl monomers are multifunctional styrenic monomers; more preferred is divinyl benzene.

Preferred polymers in the polymeric particles contain polymerized units of styrenic monomer in the amount, by weight based on the weight of the polymer, of 5% or more; more preferably 25% or more; more preferably 50% or more; more preferably 75% or more; more preferably 95% or more.

Preferred polymers have polymerized units of multifunctional vinyl monomer in an amount, by weight based on the weight of the polymer, of 1% or more; more preferably 1.5% or more; more preferably 2% or more. Preferred polymers have polymerized units of multifunctional vinyl monomer in an amount, by weight based on the weight of the polymer, of 25% or less; more preferably 20% or less; more preferably 15% or less; more preferably 11% or less; more preferably 6% or less.

Preferred polymers have polymerized units of monofunctional vinyl monomer in an amount, by weight based on the weight of the polymer, of 99% or less; more preferably 98.5% or less; more preferably 98% or less; more preferably 98.5% or less. Preferred polymers have polymerized units of monofunctional vinyl monomer in an amount, by weight based on the weight of the polymer, of 75% or more; more preferably 80% or more; more preferably 85% or more; more preferably 89% or more; more preferably 94% or more.

Preferably the polymer, after copolymerization of monomers, is subjected to a conversion process to produce an anion exchange resin. Anion exchange resins fall into the following categories. Weak base anion exchange resins have pendant amino groups that are primary, secondary, or tertiary. Strong base anion exchange resins have pendant quaternary amino groups. When any of these pendant functional groups have been attached to a polymeric bead, the bead is referred to as a "functionalized resin."

Typically, in the preparation of anion exchange resins from polymeric beads such as crosslinked polystyrene beads, the beads are advantageously haloalkylated, preferably halomethylated, most preferably chloromethylated, and the ion active exchange groups subsequently attached to the haloalkylated copolymer. Typically, the haloalkylation reaction consists of swelling the crosslinked addition copolymer with haloalkylating agent, and then reacting the copolymer and haloalkylating agent in the presence of a Friedel-Crafts catalyst. Typically, a weak base anion exchange resin is prepared by reacting the haloalkylated copolymer with ammonia, a primary amine, or a secondary amine. Typically, a strong base anion exchange resin is prepared by reacting the haloalkylated copolymer with a tertiary amine.

The collection of polymeric beads of the present invention also contains tin (II) oxide. The tin (II) oxide may be introduced into the collection of polymeric beads by any method. A preferred method is to provide anion exchange resin polymeric beads, and bring the beads into contact with an aqueous solution that contains dissolved tin (II) ions, such as, for example an aqueous solution of tin (II) chloride. Preferably, after removal of the beads from the solution containing tin (II) ions, the beads are then brought into contact with an aqueous solution having pH above 8, such as, for example, an aqueous solution of sodium hydroxide. After the beads are removed from the solution having pH above 8, the beads are preferably washed with water.

Preferably, the collection of polymeric beads has volume mean diameter of 200 micrometers or larger; more preferably 400 micrometers or larger, more preferably 600 micrometers or larger. Preferably, the collection of polymeric beads has volume mean diameter of 1,500 micrometers or smaller; more preferably 1,000 micrometers or smaller.

The collection of polymeric beads normally contains water in addition to the polymer. It is contemplated that the water is adsorbed into the functionalized polymeric beads. The amount of water is assessed by removing liquid water (if any is in contact with the polymeric beads) and then allowing the beads to reach equilibrium with air of 100% relative humidity at 23° C. The amount of water in the beads, by weight based on the total weight of the collection of functionalized polymeric beads (including both beads and adsorbed water), is preferably 30% or more; more preferably 50% or more; more preferably 60% or more; more preferably 70% or more. The amount of water in the beads, by weight based on the total weight of the collection of functionalized polymeric beads, is preferably 90% or less.

The amount of tin in the collection of polymeric beads is characterized by the weight of elemental tin as a percentage of the total weight of the anion exchange composition. Preferably, the amount of tin is 0.5% or more; more preferably 1% or more; more preferably 2% or more; more preferably 3% or more. Preferably, the amount of tin is 25% or less; more preferably 20% or less; more preferably 15% or less; more preferably 10% or less.

Preferably, most or all of the tin that is present in the collection of polymeric beads is present as tin (II) oxide. Preferably, the amount of tin that is present as tin (II) oxide, as a mole percentage of all of the tin that is present, is 90% or more; more preferably 95% or more; more preferably 99% or more.

It is preferred that most or all of the tin (II) oxide is present inside the polymeric beads or on the surfaces of the polymeric beads, or a mixture thereof, and not in the interstitial spaces between polymeric beads. Preferably, 90% or more by weight of the tin (II) oxide, based on the total weight of tin (II) oxide, is located inside a polymeric bead. Preferably, 80% or more by weight of the tin (II) oxide, based on the total weight of tin (II) oxide, is in the form of particles having diameter of less than 10 micrometer; more preferably 5 micrometer or less; more preferably 2 micrometer or less; more preferably 1 micrometer or less.

It is useful to characterize a form of tin (II) oxide that is not preferred, herein labeled "external" tin (II) oxide, which is tin (II) oxide that is in the form of particles having any dimension of 10 micrometer or larger, located in the interstitial space between polymeric beads, whether or not such particles of tin (II) oxide are in contact with the surface of one or more polymeric beads. Preferably the amount of external tin (II) oxide, as a molar percentage of all tin (II) oxide, is 10% or less; more preferably 5% or less; more preferably 2% or less; more preferably 1% or less; more preferably zero.

Preferably the polymeric beads contain little or no metals other than tin (II). Preferably, the ratio of the total weight of all metals, as elemental metals, to the weight of elemental tin (II) is 0.5:1 or less; more preferably 0.2:1 or less; more preferably 0.1:1 or less; more preferably 0.05:1 or less; more preferably 0.02:1 or less; more preferably 0.01:1 or less.

A preferred use for the polymeric beads of the present invention is the treatment of water (herein "pre-treatment" water) that contains dissolved chromium (VI) ions. The chromium (VI) ions may be present as part of any molecule, ion, or complex, as long as the chromium is in the (VI) oxidation state and as long as the molecule, ion, or complex is dissolved in the pre-treatment water. Preferred are anions that contain chromium (VI). Examples of anions that contain chromium (VI) are $HCrO_4^-$, $CrO_4^{2-}$, and $Cr_2O_7^{2-}$. Preferably, the pre-treatment water contains chromium (VI) in an amount by weight, as atomic chromium, based on the total weight of the pre-treatment water, of 0.01 ppm or more; more preferably 0.02 ppm or more; more preferably 0.05 ppm or more. Preferably, the pre-treatment water contains chromium (VI) in an amount by weight, as atomic chromium, based on the total weight of the pre-treatment water, of 100 ppm or less; more preferably 50 ppm or less; more preferably 25 ppm or less; more preferably 10 ppm or less; more preferably 5 ppm or less; more preferably 2 ppm or less; more preferably 1 ppm or less.

The pre-treatment water optionally contains one or more additional dissolved compounds. Preferred additional dissolved compounds are inorganic salts. Preferably, the total amount of all dissolved compounds is, by weight based on the total weight of the water, including the dissolved compounds, is 1% or less; more preferably 0.3% or less; more preferably 0.1% or less.

Preferably the pre-treatment water is treated by bringing the pre-treatment water into contact with the polymeric beads of the present invention. The contact may be performed by any method including, for example, batch methods and column methods.

In batch methods, the pre-treatment water and the polymeric beads are placed in a container and optionally agitated mechanically. Preferably, the water (now referred to herein as "post-treatment water") is then separated from the polymeric beads, for example by methods including decanting or filtration or a combination thereof. In batch methods, it is useful to define the ratio "R1" as the ratio of the weight of the polymeric beads in grams, measured as moist beads without bulk water present, to the total weight of atomic chromium (VI) in the batch in grams.

In column methods, a collection of the polymeric beads is placed in a container that traps the polymeric beads in place, that has an inlet for water to enter the container, that allows the water to flow through the container while making intimate contact with the polymeric beads, and that has an outlet for the water to exit the container. Pre-treatment water is introduced through the inlet, is forced by gravity or by pumps or by a combination thereof to flow through the column, and then exits the column through the outlet. After exiting the column the water is labeled herein "post-treatment water."

In column methods, the ratio R1 is characterized as follows. The weight of the collection of polymeric beads is measured in grams using beads that are moist but do not have bulk water present. Pre-treatment water is caused to flow through the column, and then the flow is stopped. The weight of chromium (VI) is considered to be the total weight in grams of all atomic chromium (VI) in all of the pre-treatment water that entered the column. Then the ratio R1 is the ratio of the weight of the collection of polymeric beads to the weight of chromium (VI).

Regardless of whether the method used is a batch method or a column method, preferably R1 is 300:1 or greater; more preferably 450:1 or greater; more preferably 900:1 or greater. Preferably, R1 is 10,000:1 or less.

The following are examples of the present invention.

The following properties were used for characterizing the collections of polymeric beads. "VMD" is the volume-based mean diameter of the particles, in micrometers (μm). "EQ-Water" is the amount of water that is found in the collection of polymeric beads after the beads have been exposed to liquid water, the excess liquid water was removed, and the beads were allowed to reach equilibrium with air at 100% relative humidity at 23° C.; then the beads were weighed, dried, and weighed again; and the weight difference is "EQ-water," expressed as the weight of water as a percentage of the original total weight of beads including the water.

The following abbreviations are used in the Examples below.

DI=deionized

ND=none detected—the detection limit of chromium was 0.05 μg/g

Sty/DVB=copolymer of styrene, divinyl benzene, and ethylvinyl benzene polycond=polycondensate Four resins were used. Prior to the introduction of tin (II) oxide, the four resins had the following properties:

| Resin | Matrix | Function | Type | Ionic Form | EQ-Water % | VMD (μm) |
|---|---|---|---|---|---|---|
| SAC-gel-C[1] | Sty/DVB | sulfonate | gel | H[+] | 80.3 | 452 |
| SBA-MP | Sty/DVB | quat[2] | MP[3] | Cl[−] | 73.9 | 703 |

-continued

| Resin | Matrix | Function | Type | Ionic Form | EQ-Water % | VMD (μm) |
|---|---|---|---|---|---|---|
| WBA-MP | Sty/DVB | tertiary amine | MP[3] | free base | 61.6 | 490-690 |
| SBA-gel | Sty/DVB | quat[2] amine | gel | Cl[−] | 45.0 | |
| PCA | polycond | amine | | | 58-68 | 300-1200 |

[1]Comparative
[2]quaternary ammonium
[3]macroporous

The following stock solutions of tin were used:
Sn(II) stock solution: 35 g of tin (II) chloride per 1000 mL of DI water
Sn(IV) stock solution: 45 g of tin (IV) chloride per 1000 mL of Di water
The following feed solutions (i.e., "pre-treatment water") were made:

| | $CrO_3$ | NaCl | $Na_2SO_4$ | $CaCl_2$ | $MgCl_2$ | DI water |
|---|---|---|---|---|---|---|
| Feed A | 0.014 g | 1.05 g | 0.35 g | — | — | 7 L |
| Feed B | 0.10 g | 1.5 g | 0.5 g | — | — | 10 L |
| Feed C | 0.102 g | 1.5 g | 0.493 g | 0.749 g | 0.745 g | 10 L |
| Feed D | 0.250 g | 1.5 g | 0.503 | 0.404 | 0.352 | 10 L |

EXAMPLE 1: LOADING OF TIN ONTO RESINS

Loading of tin onto resins was performed as follows. Resin was centrifuged to remove bulk water to give "moist" resin. 1 L of resin was mixed with 2 L of stock solution. The mixture was agitated for 4 hours, then decanted. A small sample of resin was removed for analysis. Remaining resin was mixed with 1.5 L of an aqueous solution of 1.0N NaOH. The mixture was agitated for approximately 14 hours, then decanted. The resin was washed thoroughly with DI water.

The tin content of resin was measured using inductively coupled plasma (ICP) emission spectroscopy. The detection limit of tin was 5 ppm by weight. Resin samples were tested at three stages: before exposure to the stock solution (the "Cl" or "free base" stage), immediately after exposure to the stock solution (the "SnCl2" or "SnCl4" stage), and the resin after decanting from the NaOH solution (the "NaOH" stage). The amount of tin is reported as the weight of elemental tin as a percentage of the total weight of the resin (i.e., the total weight of the collection of polymeric beads). The results were as follows:

| Example Type | Resin | stock solution | stage | Tin wt % |
|---|---|---|---|---|
| preparative | SBA-MP | none | Cl | ND |
| preparative | SBA-MP | Sn(II) | $SnCl_2$ | 0.3 |
| working | SBA-MP | Sn(II) | NaOH | 4.4 |
| comparative | SBA-MP | Sn(IV) | $SnCl_4$ | 4.5 |
| comparative | SBA-MP | Sn(IV) | NaOH | 5.6 |
| comparative | SAC-gel-C | none | free base | ND |
| comparative | SAC-gel-C | Sn(II) | $SnCl_2$ | 4.3 |
| comparative | SAC-gel-C | Sn(II) | NaOH | 2.9 |

In the above table, the material made with SBA-MP, treated with Sn(II) stock solution, and also treated with NaOH solution, is the only material that is a working example of the composition of the present invention. The other materials shown are either preparative, representing intermediate steps on the path to making the working example, or are comparative examples. Materials that use Sn(IV) or that use SAC resins fall outside the scope of the present invention.

The SAC resin took up less tin from the stock solution than did the SBA resins. Also, in the SAC resin, the amount of tin dropped as a result of the NaOH treatment. It is considered that the SAC-gel-C resin in its final stage has far less tin(II) oxide than the SBA-MP resin in its final stage.

Three resins were studied by visual observation and by optical microscopy: (1) SBA-MP, with tin (II) oxide, after the NaOH stage; (2) SBA-MP, with tin (IV) oxide, after the NaOH state, and (3) SBA-MP, with no tin treatment. For each resin, 5 g of the respective resin was placed in a 60 mL bottle with 50 mL of a chrome oxide (CrO3) solution of concentration 0.25 g/50 mL, and the pH was adjusted to 7.2 using NaOH. Each resin/CrO3 solution was placed on a shaker bath and agitated for 72 hr at room temperature (approximately 23° C.). The resin was allowed to settle, the excess liquid was decanted to a waste container, and the resin was visually inspected. Both the resin/Sn (II) hybrid and the resin control showed no signs of metal precipitant outside of the resin beads, while the resin/Sn (IV) hybrid showed significant dark, granular insoluble precipitant at the bottom of the resin. The three resins were also examined by optical microscopy. In the tin-free sample and the tin (II) oxide sample, no particles other than the polymeric beads were observed. In the tin (IV) oxide sample, many external particles outside of the polymeric beads were visible; these external particles were identified as tin (IV) oxide, and the external particles covered approximately 80% of the field of view. It is considered that observation of the resins and the microscopic images shows that the tin(II) oxide forms within the polymeric beads or directly on the surface of the beads, while the tin(IV) oxide has a much greater tendency to form particles in the interstitial spaces between the polymeric beads.

EXAMPLE 2: TREATING WATER

In various experiments, an amount of resin (see below) was placed in a 1000 mL Erlenmeyer flask with 1000 mL of a Feed solution. The mixture was stirred continuously, and the chromium content of the water was tested after 3 days and after 8 days. Chromium was studied using ICP, reported in units of microgram of chromium per gram of water (μg/g). The detection limit was 0.05 μg/g. Results were as follows:

| 0.75 g of resin/Feed A | | | | |
|---|---|---|---|---|
| Resin | Stock Solution | Stage | Cr 3 days (μg/g) | Cr 8 days (μg/g) |
| none | none | none | 1.21 | 1.27 |
| SAC-gel-C | none | free base | 0.07 | 0.08 |
| SAC-gel-C | Sn(II) | NaOH | ND | 0.11 |
| SBA-MP | none | Cl | 0.15 | ND |
| SBA-MP | Sn(II) | $SnCl_2$ | 0.17 | ND |
| SBA-MP | Sn(II) | NaOH | ND | ND |
| PCA | none | — | ND | 0.06 |

The working example of the present invention in the above table is SBA-MP/Sn(II)/NaOH. This example had the best chromium-removal performance, especially at 8 days.

| Resin SBA-MP/Feed B | | | | |
|---|---|---|---|---|
| amount of Resin | Stock Solution | Stage | Cr 3 days (µg/g) | Cr 8 days (µg/g) |
| none | non | — | 4.71 | 3.90 |
| 0.25 g | none | Cl | 1.22 | 1.09 |
| 0.50 g | none | Cl | 0.78 | 0.86 |
| 1.00 g | none | Cl | 0.54 | 0.57 |
| 0.25 g | Sn(II) | NaOH | 1.42 | 1.12 |
| 0.50 g | Sn(II) | NaOH | 0.54 | 0.69 |
| 1.00 g | Sn(II) | NaOH | 0.34 | 0.28 |
| 0.25 g | Sn(IV) | NaOH | 1.22 | 1.15 |
| 0.50 g | Sn(IV) | NaOH | 0.75 | 0.64 |
| 1.00 g | Sn(IV) | NaOH | 0.32 | 0.28 |

In the above table, the working examples of the present invention are the three samples with Sn(II). These samples remove chromium well.

EXAMPLE 3: FURTHER LOADING OF RESIN

Resin was loaded with tin as follows. Resin was loaded as in Example 1 above except that 1 L of resin was mixed with 1 L of stock solution in each sample. The equilibrium water content and the tin content were measured by the methods described above, and the results were as follows.

| Example Type | Resin | stock solution | stage | EQ-water | Tin wt % |
|---|---|---|---|---|---|
| preparative | SBA-MP | none | Cl | 74.5% | ND |
| working | SBA-MP | Sn(II) | NaOH | 74.4% | 11.0 |
| preparative | WBA-MP | none | free base | 61.6% | ND |
| working | WBA-MP | Sn(II) | NaOH | 47.0% | 18.4 |
| preparative | SBA-gel | none | Cl | 45.0% | ND |
| working | SBA-gel | Sn(II) | NaOH | 45.0% | 6.7 |

All three of the anion exchange resins tested showed acceptable ability to be loaded with tin(II) oxide.

EXAMPLE 4: FURTHER TREATING OF WATER

Resins were tested for uptake of chromium (VI) as in Example 2 above. Resins were centrifuged and decanted to remove free water. Then 0.50 g of resin was mixed with 1000 mL of feed solution. Then the chromium content of the water was tested, as above, and reported as micrograms of chromium per gram of water. Results from testing with Feed C were as follows:

| 0.50 g of resin/Feed C | | | | |
|---|---|---|---|---|
| Ex. Type | Resin | Stock Solution | Stage | Cr 3 days (µg/g) | Cr 8 days (µg/g) |
| comparative | none | none | — | 5.5 | 5.2 |
| comparative | SBA-MP | none | Cl | 1.3 | 1.5 |
| working | SBA-MP | Sn(II) | NaOH | 1.0 | 1.2 |
| comparative | WBA-MP | none | free base | 1.7 | 1.4 |
| working | WBA-MP | Sn(II) | NaOH | 1.2 | 1.0 |
| comparative | SBA-gel | none | Cl | ND | ND |
| working | SBA-gel | Sn(II) | NaOH | ND | ND |

In all three of the anion exchange resins tested, the tin-loaded resin performed well and performed better than the same resin without tin.

Additionally, 0.50 grams of resin was tested with 1000 mL of Feed D solution using the method described above. The chromium content of the water was tested, as above, and reported as micrograms of chromium per gram of water. The results were as follows:

| 0.50 g of resin/Feed D | | | | |
|---|---|---|---|---|
| Ex. Type | Resin | Stock Solution | Stage | Cr 3 days (µg/g) | Cr 8 days (µg/g) |
| comparative | none | none | — | 14 | 14 |
| comparative | SBA-MP | none | Cl | 5.9 | 5.7 |
| working | SBA-MP | Sn(II) | NaOH | 5.8 | 5.6 |
| comparative | WBA-MP | none | free base | 11 | 12 |
| working | WBA-MP | Sn(II) | NaOH | 9.4 | 9.1 |
| comparative | SBA-gel | none | Cl | 2.1 | 2.0 |
| working | SBA-gel | Sn(II) | NaOH | 1.9 | 1.8 |

In all three of the anion exchange resins tested, the tin-loaded resin performed well and performed better than the same resin without tin.

The invention claimed is:

1. An anion exchange composition comprising
   (a) polymeric beads having covalently bound amine groups, and
   (b) tin(II) oxide;
   wherein 90% or more by weight of the tin(II) oxide, based on total weight of tin(II) oxide, is present inside the polymeric beads and tin(II) oxide is not present in interstitial spaces between the polymeric beads; and
   wherein the polymeric beads comprise a polymer that comprises polymerized units of at least one monofunctional vinyl monomer selected from the group consisting of styrene monomers; at least one monofunctional vinyl monomer selected from the group consisting of acrylate monomers; and optionally polymerized units of one or more multifunctional vinyl monomers.

2. The composition of claim 1, wherein the tin(II) oxide is present in an amount such that the amount of elemental tin is 0.5% to 20% by weight based on the weight of the composition.

3. The composition of claim 1, wherein the polymeric beads have a volume mean diameter of 200 micrometers or larger.

4. The composition of claim 1, wherein the polymeric beads have a volume mean diameter of 400 micrometers or larger.

5. The composition of claim 1, wherein the polymeric beads have a volume mean diameter of 600 micrometers or larger.

6. The composition of claim 1, wherein the polymeric beads have a volume mean diameter of 600 to 1,000 micrometers.

7. The composition of claim 1, wherein the tin(II) oxide present inside the polymeric beads is in the form of particles having a diameter of less than 10 micrometers.

8. The composition of claim 1, wherein the tin(II) oxide present inside the polymeric beads is in the form of particles having a diameter of 5 micrometers or less.

9. The composition of claim 1, wherein the tin(II) oxide present inside the polymeric beads is in the form of particles having a diameter of 2 micrometers or less.

10. The composition of claim 1, wherein the tin(II) oxide present inside the polymeric beads is in the form of particles having a diameter of 1 micrometer or less.

\* \* \* \* \*